United States Patent
Yang et al.

(10) Patent No.: US 12,297,313 B2
(45) Date of Patent: May 13, 2025

(54) RESIN COMPOSITION INCLUDING TRIMODAL FILLER COMPONENT, BATTERY MODULE, BATTERY PACK, AND AUTOMOBILE INCLUDING THE SAME

(71) Applicant: LG Chem, Ltd., Seoul (KR)

(72) Inventors: Young Jo Yang, Daejeon (KR); Eun Suk Park, Daejeon (KR); Hyoung Sook Park, Daejeon (KR); Yang Gu Kang, Daejeon (KR); Jeong Hyun Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 554 days.

(21) Appl. No.: 17/634,652

(22) PCT Filed: Aug. 19, 2020

(86) PCT No.: PCT/KR2020/011031
§ 371 (c)(1),
(2) Date: Feb. 11, 2022

(87) PCT Pub. No.: WO2021/034099
PCT Pub. Date: Feb. 25, 2021

(65) Prior Publication Data
US 2022/0289891 A1 Sep. 15, 2022

(30) Foreign Application Priority Data
Aug. 19, 2019 (KR) .................. 10-2019-0100983

(51) Int. Cl.
*C08G 18/02* (2006.01)
*C08K 3/013* (2018.01)
(Continued)

(52) U.S. Cl.
CPC .............. *C08G 18/02* (2013.01); *C08K 3/013* (2018.01); *H01M 50/209* (2021.01);
(Continued)

(58) Field of Classification Search
CPC ..... C08G 18/02; C08K 3/013; H01M 50/249; H01M 50/209; H01M 50/293
(Continued)

(56) References Cited

U.S. PATENT DOCUMENTS

| 2011/0168376 A1 | 7/2011 | Keite-Telgenbuscher et al. |
| 2015/0065613 A1* | 3/2015 | Balijepalli ............... C08K 3/36 523/466 |

(Continued)

FOREIGN PATENT DOCUMENTS

| JP | 2012107153 A | 6/2012 |
| JP | 2013189625 A | 9/2013 |

(Continued)

OTHER PUBLICATIONS

International Search Report for Application No. PCT/KR2020/011031 mailed Nov. 24, 2020, 3 Pages.
(Continued)

*Primary Examiner* — Sean P Cullen
(74) *Attorney, Agent, or Firm* — Lerner David LLP

(57) ABSTRACT

A resin composition capable of improving or minimizing a load applied to injection equipment, such as a nozzle, when injected by the equipment is provided. The resin composition includes a thermally conductive filler capable of exhibiting a desired thermal conductivity.

16 Claims, 5 Drawing Sheets

(51) Int. Cl.
  *H01M 50/209* (2021.01)
  *H01M 50/249* (2021.01)
  *H01M 50/293* (2021.01)
(52) U.S. Cl.
  CPC ....... *H01M 50/249* (2021.01); *H01M 50/293* (2021.01); *C08G 2330/00* (2013.01); *C08K 2201/001* (2013.01); *H01M 2220/20* (2013.01)
(58) Field of Classification Search
  USPC ........ 429/120, 156, 158, 159; 523/134, 220, 523/223
  See application file for complete search history.

(56) References Cited

U.S. PATENT DOCUMENTS

| | | | |
|---|---|---|---|
| 2018/0076493 | A1 | 3/2018 | Park et al. |
| 2018/0127629 | A1 | 5/2018 | Takanashi et al. |
| 2019/0309207 | A1 | 10/2019 | Kang et al. |
| 2020/0197888 | A1 | 6/2020 | Cho et al. |
| 2020/0208618 | A1 | 7/2020 | Cho et al. |
| 2020/0220124 | A1 | 7/2020 | Park et al. |
| 2021/0028414 | A1* | 1/2021 | Cho .................... H01M 50/227 |
| 2021/0163708 | A1 | 6/2021 | Mukai et al. |

FOREIGN PATENT DOCUMENTS

| | | | |
|---|---|---|---|
| JP | 2018510463 | A | 4/2018 |
| JP | 2020531265 | A | 11/2020 |
| JP | 2020531279 | A | 11/2020 |
| KR | 20110065423 | A | 6/2011 |
| KR | 20160105354 | A | 9/2016 |
| KR | 20180108768 | A | 10/2018 |
| KR | 20180125824 | A | 11/2018 |
| KR | 20190030984 | A | 3/2019 |
| KR | 20190084223 | A | 7/2019 |
| WO | 2016190188 | A1 | 12/2016 |
| WO | 2018212553 | A1 | 11/2018 |
| WO | WO-2019203431 | A1 * | 10/2019 .............. B60L 50/50 |

OTHER PUBLICATIONS

Extended European Search Report including Written Opinion for Application No. 20855303 1.9 dated Aug. 4, 2022, pp. 1-9.
Resonac: "Alunabeads CB Series Typical properties of common grades", Feb. 1, 2023 (Feb. 1, 2023 ), XP093188601, Retrieved from the Internet: URL:https://www.resonac.com/sites/default/files/2023-02/pdf-productsalumina-beads_CB.pdf [retrieved on Jul. 23, 2024].
Showa Denko: "Alunabeads", Feb. 1, 2009 (Feb. 1, 2009 ), XP093188604, Retrieved from the Internet: URL: http:/113.115.93. 151 /wp-content/uploads/2018/03/Alunabeads.pdf [retrieved on Jul. 23, 2024].
Sumitomo Chemical: "Product Databook", Mar. 1, 2024 (Mar. 1, 2024 ), XP093188605, Retrieved from the Internet: URL:https://www.sumitomo-chem.co.jp/english/products/files/docs/en_a06008.pdf [retrieved on Jul. 23, 2024].

* cited by examiner

RESIN COMPOSITION INCLUDING TRIMODAL FILLER COMPONENT, BATTERY MODULE, BATTERY PACK, AND AUTOMOBILE INCLUDING THE SAME

CROSS-REFERENCE TO RELATED APPLICATIONS

The present application is a national stage entry under 35 U.S.C. § 371 of International Application No. PCT/KR2020/011031 filed on Aug. 19, 2020, which claims the benefit of priority based on Korean Patent Application No. 10-2019-0100983 filed on Aug. 19, 2019, the disclosures of which are incorporated herein by reference in their entirety.

TECHNICAL FIELD

The present application relates to a resin composition.

The present application also relates to a battery module comprising a cured product of the resin composition; and a battery pack comprising the battery module.

BACKGROUND ART

It is very useful in various fields to make electric devices such as batteries or various electronic devices lighter, smaller, highly functional, and multifunctional.

For example, batteries applied to automobiles are required to be manufactured with a high-capacity while being smaller and lighter.

For the lightweight, miniaturization, high functionalization and multi-functionalization, and the like, electric devices or electronic devices are often highly integrated.

For example, in order to manufacture a high-capacity battery module, the number of battery cells relative to the volume should be increased.

The highly integrated electronic devices or electrical devices generate more heat during an operation process, and accordingly, a technology for controlling the generated heat becomes more important.

A typical example of a heat dissipation material for heat control is a composite material in which a thermally conductive filler material such as a carbon material or a ceramic material is mixed with a polymer material.

As the thermal conductivity of the composite material increases, heat can be effectively controlled, and as the ratio of the thermally conductive filler material generally increases, the thermal conductivity of the composite material increases.

However, as the content of the thermally conductive filler increases, a problem may occur in the process of applying the heat dissipation material.

Patent Document 1 discloses the content of using a heat dissipation material (heat dissipation adhesive) to which a heat conductive filler is introduced in order to transfer the heat generated in a battery cell to a heat conductive battery module case.

As shown in FIG. 1, in Patent Document 1, an injection device (30) such as a nozzle is inserted into an injection hole (20) formed in a battery module case (10) in order to apply a heat dissipation material, and the heat dissipation material is injected inside the battery module case through the injection device (30).

When the heat dissipation material containing an excessive amount of thermally conductive filler is injected with a device having a relatively small diameter such as a nozzle, a large pressure is generated inside the device during the injection process, and a large load is applied to the device.

As shown in FIG. 1, if the injection of the heat dissipation material is performed in a state where the battery cell (40) is accommodated in the battery module case (10), the space into which the heat dissipation material is injected is relatively narrow, so that a pressure is also generated inside the case (10), which puts more load on the device.

Also, in order to secure a high thermal conductivity, the heat dissipation material containing an excessive amount of thermally conductive filler is solidified inside the nozzle 30, which is equipment, by aggregation of fillers, or the like, during the injection process as described above, where such solidified components further narrow the passage through which the heat dissipation material passes and the load applied to the equipment becomes larger.

Such a problem may occur in common not only in the manufacturing process of the battery module as in Patent Document 1, but also in the case of injecting a material containing an excessive amount of filler with the equipment such as the nozzle.

Such a load applied to the equipment reduces the lifespan of the equipment, thereby causing product defects or an increase in cost through frequent replacement of the equipment.

In order to solve the above problem, it may be considered to reduce the content of the filler included in the material. If the content of the filler is reduced in the material, it is possible to reduce the load applied to the equipment in the process.

However, if the amount of the filler is reduced, the effect to be obtained through the introduction of the filler cannot be obtained. For example, if the content of the thermally conductive filler is reduced, the thermal conductivity of the heat dissipating material is lowered.

PRIOR ART DOCUMENT

Patent Document (Patent Document 1) Korean Laid-Open Patent Publication No. 2016-0105354

DISCLOSURE

Technical Problem

The present application provides a resin composition comprising a thermally conductive filler.

The present application aims to be capable of improving or minimizing a load applied to injection equipment when the resin composition has been injected by the equipment such as a nozzle, while comprising a thermally conductive filler to the extent that it is capable of exhibiting a desired thermal conductivity.

The present application also relates to a battery module comprising the resin composition or a cured product thereof; a battery pack comprising the battery module; and an automobile comprising the battery module or battery pack.

Technical Solution

Among physical properties mentioned in this specification, when the measured temperature affects the result, the relevant physical property is a physical property measured at room temperature, unless otherwise specified. The term room temperature is a natural temperature without heating or cooling, which usually means any temperature within a range of about 10° C. to 30° C., or a temperature of about 23° C. or about 25° C. or so. In addition, unless otherwise specified in this specification, the unit of temperature is ° C.

Among physical properties mentioned in this specification, when the measured pressure affects the result, the relevant physical property is a physical property measured at normal pressure. The term normal pressure is a natural pressure without pressurizing or depressurizing, where usually about 1 atmosphere or so is referred to as normal pressure.

The present application relates to a resin composition. The resin composition comprises a filler component. The term filler component means a component consisting of a filler, that is, a component comprising only the filler.

In one example, the filler component may comprise two or more fillers having different average particle diameters. In one example, the filler component may comprise three or more fillers having different average particle diameters, or may be composed of three to six, three to five, three to four, or three fillers, having different average particle diameters. That is, in one example, the filler component may also comprise only three to six, three to five, three to four, or three fillers, having different average particle diameters.

In another example, the filler component may exhibit at least two peaks in a volume curve of a particle size distribution measured using laser diffraction. In one example, the filler component may exhibit three or more peaks in the volume curve of the particle size distribution, or may exhibit three to six, three to five, three to four, or three peaks. For example, in the range of the filler component exhibiting three peaks, the filler component exhibiting one, two, or four or more peaks is not included.

The average particle diameter in the filler of the present application means a particle diameter at which the volume accumulation becomes 50% in the volume curve of the particle size distribution measured by laser diffraction, which may also be referred to as a median diameter. That is, in the present application, the particle size distribution is obtained on a volume basis through the laser diffraction, and the particle diameter at the point where the cumulative value becomes 50% in the cumulative curve with 100% of the total volume is set as the average particle diameter, and in another example, such an average particle diameter may be referred to as a median particle size or a D50 particle diameter.

Therefore, here, the two fillers having different average particle diameters may mean fillers having different particle diameters at the point where the cumulative value becomes 50% in the volume curve of the particle size distribution.

When two or more fillers having different average particle diameters are usually mixed in order to form a filler component, as many peaks as the types of mixed fillers appear on the volume curve of the particle size distribution measured using laser diffraction with respect to the filler component. Therefore, for example, when three fillers having different average particle diameters are mixed to constitute a filler component, the volume curve of the particle size distribution measured using the laser diffraction with regard to the filler component shows three peaks.

The filler component of the resin composition of the present application may be a thermally conductive filler component. The term thermally conductive filler component means a filler component functioning so that the resin composition can be cured to exhibit a thermal conductivity to be described below.

The resin composition of the present application may exhibit a low load value even in a state where the thermally conductive filler component is included in a ratio capable of exhibiting a high thermal conductivity. An excess of filler component usually results in high load values. However, the resin composition of the present application may provide a resin composition which can be cured to exhibit a high thermal conductivity while having a relatively low load value through adjustment of particle diameters and/or ratios of fillers included in the filler component. In the present application, the definition of the load value will be described below.

Such a resin composition can minimize or eliminate the load applied to the equipment even when injected through the equipment having a relatively small particle diameter, such as a nozzle, during the application process.

In one example, the resin composition may be a resin composition used for a battery module or a battery pack, and specifically, may be a resin composition used to construct the battery module or battery pack in the same form as in Patent Document 1. Thus, for example, as described below, the resin composition of the present application may be a composition which is used to fix battery cells in the battery module by being injected into the case of the battery module and contacting one or more battery cells present in the battery module. The resin composition of the present application may be, for example, an adhesive composition.

The resin composition comprises a resin component and fillers, where the fillers may comprise at least a first filler having an average particle diameter of 60 μm to 200 μm, a second filler having an average particle diameter in a range of 10 μm to 30 μm, and a third filler having an average particle diameter of 5 μm or less. In one example, the resin component may comprise a main resin and a curing agent. When the resin composition is a urethane composition, the main resin may be a polyol, and the curing agent may be an isocyanate.

In one example, the filler component satisfies the following general formulas 1 and 2.

$$2 \leq W_A/W_B \leq 5 \quad \text{[General Formula 1]}$$

$$0.5 \leq W_B/W_C \leq 3 \quad \text{[General Formula 2]}$$

In General Formulas 1 and 2, $W_A$ is the weight ratio of the first filler in the filler component, $W_B$ is the weight ratio of the second filler in the filler component, and $W_C$ is the weight ratio of the third filler in the filler component.

The weight ratios $W_A$, $W_B$ and $W_C$ are weight ratios (weight %) of the first to third fillers, respectively, when the weight of the total filler contained in the filler component is 100 weight %.

In another example, the first filler may have an average particle size of about 62 μm or more, 64 μm or more, 66 μm or more, or about 68 μm or more, and/or about 195 μm or less, 190 μm or less, 185 μm or less, 180 μm or less, 175 μm or less, 170 μm or less, 165 μm or less, 160 μm or less, 155 μm or less, 150 μm or less, 145 μm or less, 140 μm or less, 135 μm or less, 130 μm or less, 125 μm or less, about 120 μm or less, 115 μm or less, 110 μm or less, 105 μm or less, 100 μm or less, 95 μm or less, 90 μm or less, 85 μm or less, 80 μm or less, or about 75 m or less.

In another example, the second filler may have an average particle diameter of about 12 μm or more, 13 μm or more, 14 μm or more, 15 μm or more, 16 μm or more, 17 μm or more, 18 μm or more, 19 μm or more, or 20 μm or more, and/or about 29 μm or less, 28 μm or less, 27 μm or less, 26 μm or less, 25 μm or less, 24 μm or less, 23 μm or less, 22 μm or less, 21 μm or less, or about 20 μm or less.

In another example, the third filler may have an average particle diameter of about 0.01 µm or more, 0.1 µm or more, about 0.5 µm or more, 1 µm or more, 1.5 µm or more, or 2 m or more, and/or also about 5 µm or less, 4.5 µm or less, about 4 µm or less, 3.5 µm or less, 3 µm or less, 2.5 µm or less, or 2 µm or less or so.

The ratio (D1/D3) of the average particle diameter (D1) of the first filler to the average particle diameter (D3) of the third filler in the filler component may be in a range of 25 to 300.

In one example, the third filler may be a filler having the smallest average particle diameter among fillers included in the filler component when the filler component comprises two or more fillers having different average particle diameters, and the first filler may be a filler having the largest average particle diameter among fillers included in the filler component when the filler component comprises two or more fillers having different average particle diameters. In such a state, the particle diameter ratio may be satisfied.

In another example, the ratio (D1/D3) may also be further adjusted in a range of 26 or more, 27 or more, 28 or more, 29 or more, 30 or more, 31 or more, 32 or more, 33 or more, 34 or more, 35 or more, 40 or more, 50 or more, 60 or more. or more, 70 or more, 80 or more, 90 or more, 100 or more, 110 or more, 120 or more, 130 or more, 140 or more, 150 or more, 160 or more, 170 or more, 180 or more, 190 or more, 200 or more, 210 or more, 220 or more, 230 or more, or 235 or more and/or in a range of 290 or less, 280 or less, 270 or less, 260 or less, 250 or less, 240 or less, 220 or less, 200 or less, 180 or less, 160 or less, 140 or less, 120 or less, about 100 or less, 95 or less, 90 or less, 85 or less, 80 or less, about 75 or less, 70 or less, 65 or less, or about 60 or less.

Also, in the filler component, the ratio (D1/D2) of the average particle diameter (D1) of the first filler to the average particle diameter (D2) of the second filler may be in a range of about 3 to 20. In another example, the ratio (D1/D2) may be 3.1 or more, 3.2 or more, 3.3 or more, 3.4 or more, or 3.5 or more, or may also be 19 or less, 18 or less, 17 or less, 16 or less, 15 or less, 14 or less, 13 or less, 12 or less, 11 or less, 10 or less, 9 or less, 8 or less, 7 or less, 6 or less, 5 or less, or 4 or less or so.

In another example, the $W_A/W_B$ value of General Formula 1 may be about 2.1 or more, 2.2 or more, 2.3 or more, about 2.4, about 2.5 or more, about 2.6 or more, about 2.7 or more, about 2.8 or more, about 2.9 or more, or about 3 or more, and/or may also be 4.9 or less, 4.8 or less, 4.7 or less, 4.6 or less, 4.5 or less, 4.4 or less, 4.3 or less, 4.2 or less, 4.1 or less, 4.0 or less, 3.9 or less, 3.8 or less, 3.7 or less, 3.6 or less, 3.5 or less, 3.4 or less, 3.3 or less, 3.2 or less, 3.1 or less, 3.0 or less, 2.9 or less, 2.8 or less, 2.7 or less, 2.6 or less, or 2.5 or less.

In another example, the $W_B/W_C$ value of General Formula 2 may be about 0.6 or more, 0.7 or more, 0.8 or more, about 0.9 or more, 1 or more, 1.1 or more, 1.2 or more, 1.3 or more, 1.4 or more, or 1.5 or more, and/or may also be 2.9 or less, 2.8 or less, 2.7 or less, 2.6 or less, 2.5 or less, 2.4 or less, 2.3 or less, 2.2 or less, 2.1 or less, 2.0 or less, 1.9 or less, 1.8 or less, 1.7 or less, 1.6 or less, 1.5 or less, 1.4 or less, 1.3 or less, 1.2 or less, 1.1 or less, 1.0 or less, 0.9 or less, 0.8 or less, 0.7 or less, 0.6 or less, or 0.5 or less or so.

In order to form a resin layer with an excellent thermal conductivity, an excessive amount of filler must be applied to the resin composition, and when the filler is applied in excess, the viscosity of the resin composition increases significantly, the injection equipment becomes overloaded, the resin component is released by the residual pressure of the injection equipment and the filler is agglomerated at the part of the injection equipment, where the resin composition is discharged, to form a hard solid matter, whereby the life of the injection equipment can be shorten.

In the present application, the meaning that the solid matter is hard may mean that the hardness of the solid matter is about 60 gf or more or so. Meanwhile, when a specimen of a solid matter cut to a certain size is pressed at a constant speed of 3 mm/s using a pressurizing means, the hardness of the solid matter may mean a force (gf) applied to the pressurizing means about 0.5 seconds after the specimen is pressed, wherein the force applied to the pressurizing means starts to be measured from the time when the specimen is pressed. Such a hardness of the solid matter may be measured in the manner described in Examples of this specification.

When the contents of the first filler to the third filler having average particle diameters in the above ranges satisfy General Formulas 1 and 2 above, the overload of the injection equipment for injecting the resin composition may be improved, and even if the phenomenon that the resin composition is released by the residual pressure of the injection equipment and the filler is agglomerated occurs, it is possible to prevent the occurrence of the hard solid matter, thereby facilitating the removal of the solid matter and also improving the lifespan of the injection equipment.

The resin composition may have a thermal conductivity of 3.0 W/mK or more after curing, and may form, for example, a resin layer having the thermal conductivity. As another example, the resin layer may also have a thermal conductivity of about 50 W/mK or less, 45 W/mK or less, 40 W/mK or less, 35 W/mK or less, 30 W/mK or less, 25 W/mK or less, 20 W/mK or less, 15 W/mK or less, about 10 W/mK or less, 9 W/mK or less, 8 W/mK or less, 7 W/mK or less, 6 W/mK or less, 5 W/mK or less, or 4 W/mK or less or so. The thermal conductivity of the resin layer may be measured according to, for example, ASTM D5470 standard or ISO 22007-2 standard. The resin composition that is cured to exhibit a thermal conductivity of at least 3.0 W/mK or more is useful in various applications, and is particularly effective in dissipating heat generated inside the battery module to the outside.

The resin composition of the present application may exhibit a low load value. For example, the resin composition may have a load value of less than 30 kgf.

In the present application, the load value is a numerical value quantifying how much load is applied to equipment having a narrow diameter such as a nozzle when a resin composition is injected by the relevant equipment. For example, if the resin composition is a two-component type comprising a main composition and a curing agent composition, the load value is a value measured immediately after mixing the main composition and the curing agent composition.

The load value may be measured by the method of the example item to be described below. That is, the load value may be measured through the force applied in the pushing process while pushing the resin composition using a device, such as a static mixer, capable of simulating the equipment having a narrow diameter such as the nozzle.

The load value may be a maximum value of the force applied when the resin composition is pushed out at a constant velocity (1 mm/s) so that the resin composition is passed through the inside of a static mixer (a stepped static mixer that a circular discharge part has a diameter of 2 mm and the number of elements is 16) (e.g., SULZER, MBH-06-16T) and discharged to the discharge part of the mixer.

When the resin composition is pushed out, a general TA (Texture analyzer) equipment can be used.

When the resin composition is a two-component type, the load values can be measured in the same manner by connecting two cartridges to the front end of the static mixer, loading the main and curing agent compositions into the two cartridges, respectively, and then injecting them into the static mixer at a constant speed.

The load value can be measured at the point where the force applied to the pressurizing means (TA equipment) becomes a maximum value, wherein the force starts to be measured from the time the resin composition is first discharged to the discharge part of the static mixer by the above method.

Usually, when the force is measured in the same way as above, the relevant force increases with time and then decreases again, or increases and then does not increase anymore, where the load value is the maximum value of the force before the decrease, or the maximum force that has not increased any more.

In another example, the load value may be greater than 10 kgf, greater than 11 kgf, greater than 12 kgf, greater than 13 kgf, greater than 14 kgf, greater than 15 kgf, greater than 16 kgf, greater than 17 kgf, greater than 18 kgf, greater than 19 kgf, greater than 20 kgf, greater than 21 kgf, greater than 22 kgf, greater than 23 kgf or greater than 24 kgf, and/or may be less than 29 kgf, less than 28 kgf, less than 27 kgf or less than 26 kgf or so.

Even when the resin composition is discharged using equipment having a discharge port with a narrow diameter, such as a nozzle or a static mixer in the case that the resin composition has the load value as above, the process can be performed effectively while minimizing the burden on the equipment. Such a resin composition is very useful in various applications, and is particularly advantageous for forming a battery module having a specific structure as described below.

Usually, the lower the load value, the less the burden applied on the equipment is, but if the load value is too low, overflow may occur after injection of the resin composition or the storage stability of the resin composition may be deteriorated, so that it may be appropriate for the load value to be determined in the above-described range.

In Examples of the present application, the load value of the resin composition has been measured using a mixer (equipment) in which a cartridge and a mixer are combined, and FIG. 2 illustratively shows the equipment. The equipment (1) comprises two cartridges (2) and one mixer (5), where the cartridge may have a pressurizing means (3).

Here, the applied cartridge (2) is not particularly limited, where a known cartridge may be used as long as it can accommodate the main composition and the curing agent composition. In one embodiment, the cartridge for accommodating the main composition or curing agent composition may be of a circle having a diameter of about 15 mm to about 20 mm, first discharge parts (4, 4a, 4b) for discharging the main composition or curing agent composition may be of a circle having a discharge part diameter of about 2 mm to about 5 mm, its height may be about 80 mm to about 300 mm, and its total volume may be about 10 ml to about 100 ml.

The cartridge (2, 2a, 2b) may have a pressurizing means (3, 3a, 3b). The pressurizing means (3, 3a, 3b) is not particularly limited, and a known pressurizing means can be used. As one example, the pressurizing means may use a TA (Texture analyzer). The pressurizing means (3, 3a, 3b) may pressurize the cartridges (2, 2a, 2b) to discharge the main composition and the curing agent composition inside the cartridges through the mixer (5). The pressurizing speed of the pressurizing means (3, 3a, 3b) may be about 0.01 to about 2 mm/s. For example, the pressurizing speed may be about 0.01 mm/s or more, 0.05 mm/s or more, or about 0.1 mm/s or more, and may be about 1.5 mm/s or less, about 1 mm/s or less, 0.8 mm/s or less, 0.6 mm/s or less, 0.4 mm/s or less, or about 0.2 mm/s or less, or may also be about 1 mm/s or less or so.

A static mixer may be used as the mixer (5). In one embodiment, the static mixer (5) has two receiving parts (6, 6a, 6b) for receiving the main composition and the curing agent composition, respectively, from the two cartridges (2, 2a, 2b), and one second discharge part (7) for discharging the resin composition mixed by the static mixer (5), where the sizes of the receiving parts (6, 6a, 6b) may be each a circle with a diameter of about 2 mm to about 5 mm and the second discharge part (7) may be of a circle having a diameter of about 1 mm to about 3 mm, and the number of elements may be about 5 to about 20.

The capacity of the mixer may have a capacity satisfying a range of General Formula 2 below.

$$V < t2/td \times Q \qquad \text{[General Formula 2]}$$

In General Formula 2, V is the capacity of the static mixer, t2 is the time for doubling the viscosity of the resin composition, td is the dispensing process time, and Q is the injection amount per process unit time. When the capacity of the static mixer is greater than the time (t2) for doubling the viscosity, the viscosity increases as the retention time increases in excess of the amount used per unit process, and the process speed slows down, or in severe cases, the resin composition is cured, whereby there is a possibility that the mixer clogs.

As one example, the filler component may be present in a ratio of about 91 parts by weight or less in 100 parts by weight of the resin composition. As another example, the filler component may be included in a ratio of about 90.5 parts by weight or less, 90.0 parts by weight or less, 89.5 parts by weight or less, 89.0 parts by weight or less, 88.5 parts by weight or less, or 88.0 parts by weight or less in 100 parts by weight of the resin composition, and the filler component may be present in a ratio of about 70 parts by weight or more, 71 parts by weight or more, 72 parts by weight or more, 73 parts by weight or more, 74 parts by weight or more, about 75 parts by weight or more, 76 parts by weight or more, 77 parts by weight or more, 78 parts by weight or more, 79 parts by weight or more, 80 parts by weight or more, 81 parts by weight or more, 82 parts by weight or more, 83 parts by weight or more, 84 parts by weight or more, 85 parts by weight or more, 86 parts by weight or more, 87 parts by weight or more, or 88 parts by weight or more in 100 parts by weight of the resin composition.

In another example, the ratio of the filler component in the resin composition may be present in a ratio of about 91 weight % or less. As another example, the filler component may be included in a ratio of about 90.5 weight % or less, 90.0 weight % or less, 89.5 weight % or less, 89.0 weight % or less, 88.5 weight % or less, or 88.0 weight % or less in the resin composition, and the filler component may be present in a ratio of about 70 weight % or more, 71 weight % or more, 72 weight % or more, 73 weight % or more, 74 weight % or more, about 75 weight % or more, 76 weight % or more, 77 weight % or more, 78 weight % or more, 79 weight % or more, 80 weight % or more, 81 weight % or more, 82 weight % or more, 83 weight % or more, 84 weight % or more, 85 weight % or more, 86 weight % or more, 87 weight % or more, or 88 weight % or more in the resin composition.

If the content of the filler component is too large, the overload may occur in the injection equipment for injecting the resin composition, thereby shortening the life of the injection equipment, and if the content is too small, the resin composition may be cured, thereby lowering the implemented thermal conductivity, but it is possible to ensure the proper thermal conductivity and load value within the above range.

As one example, the first filler may be present in a ratio within a range of about 50 parts by weight to about 80 parts by weight in 100 parts by weight of the total filler component. In another example, the ratio of the first filler in the filler component may be about 52 parts by weight or more, 54 parts by weight or more, about 56 parts by weight or more, or about 58 parts by weight or more, and it may be included in a ratio of about 78 parts by weight or less, 76 parts by weight or less, 74 parts by weight or less, about 72 parts by weight or less, about 70 parts by weight or less, about 68 parts by weight or less, about 66 parts by weight or less, or about 64 parts by weight or less.

In another example, the ratio of the first filler in the filler component may be in the range of about 50 to about 80 weight %. In another example, the ratio of the first filler in the filler component may be about 52 weight % or more, 54 weight % or more, about 56 weight % or more, or about 58 weight % or more, and may also be about 78 weight % or less, 76 weight % or less, 74 weight % or less, about 72 weight % or less, about 70 weight % or less, about 68 weight % or less, about 66 weight % or less, or about 64 weight % or less.

When the content of the first filler is included in the resin composition in a ratio within the above range, it is advantageous to satisfy General Formula 1 above, and thus it is possible to prevent overload of the injection equipment, and also it is possible to prevent the generation of hard solid matters, whereby it is advantageous to improve the lifespan of the injection equipment.

In one example, the filler component may comprise 30 weight % or more of a spherical filler. Usually, if the shape of the filler is spherical, it is not advantageous to achieve a higher thermal conductivity. That is, in terms of thermal conductivity, it is advantageous to use a non-spherical shape as a filler. However, when the filler is non-spherical, it is not advantageous in terms of the load value or the hardness of the solid matter, so that by comprising the spherical filler in an amount of a certain level or more in the filler component, advantageous effects can be exerted in terms of the load value and the hardness of the solid matter. In addition, according to the composition of the present application, the high thermal conductivity can be achieved even under the content of the spherical filler as above. In another example, the content of the spherical filler in the filler component may be 35 weight % or more, 40 weight % or more, 45 weight % or more, 50 weight % or more, 55 weight % or more, 60 weight % or more, 65 weight % or more, 70 weight % or more. or more, 75 weight % or more, 80 weight % or more, 85 weight % or more, 90 weight % or more, or 95 weight % or more. The content upper limit of the spherical filler in the filler component may be adjusted in the range of 95 weight % or less, 90 weight % or less, 85 weight % or less, 80 weight % or less, or 75 weight % or less in consideration of the thermal conductivity, load value and hardness characteristics of the solid matter.

For example, if a non-spherical filler is present in the filler component, it is advantageous that a filler having a small average particle diameter is selected as the non-spherical filler. For example, if the filler component comprises the first to third fillers, the non-spherical filler may be selected as the third filler.

The term spherical filler is a filler having a sphericity of 0.9 or more. In another example, the sphericity of the spherical filler may be 0.95 or more. Therefore, a filler having a sphericity of less than 0.9 is a non-spherical filler.

The sphericity can be confirmed through particle shape analyses of particles. In one embodiment, the sphericity of the filler may be defined as a ratio (S'/S) of a surface area (S) of a particle and a surface area (S') of a sphere having the same volume as that of the particle. For real particles, circularity is generally used. After obtaining a two-dimensional image of a real particle, the circularity is expressed as a ratio of the boundary (P) of the image and the boundary of a circle having the same image and the same area (A), and is obtained by the following equation.

$$\text{Circularity} = 4\pi A/P^2 \qquad \text{<Circularity Equation>}$$

The circularity is indicated by a value ranging from 0 to 1, where a perfect circle has a value of 1, and the more irregular the shape of the particle, it has a value lower than 1.

As one example, the filler component may comprise an alpha ($\alpha$)-phase filler (e.g., alpha-phase alumina filler, etc.) in a ratio of 90 weight % or less based on 100 weight % of the total filler. In general, when the filler is in an alpha phase, it is advantageous to secure the thermal conductivity. However, if the alpha-phase filler is excessively increased, it is disadvantageous in terms of the load value or the solid matter hardness. Therefore, in the present application, the ratio of the alpha phase included in the filler component may be within the above range. According to the composition of the present application, even when the ratio of the alpha phase is limited as above, it is possible to achieve the high thermal conductivity, and it is also possible to obtain advantageous results in the load value and solid matter hardness characteristics. As another example, the filler component may comprise the alpha phase in a range of about 40 weight % or more, about 42 weight % or more, 44 weight % or more, 46 weight % or more, 48 weight % or more, 50 weight % or more, 52 weight % or more, or 54 weight % or more based on 100 weight % of the total filler, or may comprise it in an amount of 85 weight % or less, 80 weight % or less, 75 weight % or less, about 70 weight % or less, 65 weight % or less, or 60 weight % or less.

A method of obtaining the ratio of the alpha ($\alpha$)-phase in the filler component is not particularly limited. That is, after analyzing the crystal phases (e.g., alpha or beta gamma phase in the case of alumina) of the fillers in the filler component through conventional XRD analyses, the ratio of the alpha phase in the crystal phases may be confirmed.

As one example, the filler component may be a thermally conductive filler component. As described above, the term thermally conductive filler is a filler component functioning so that the resin composition is cured to exhibit a thermal conductivity of about 3.0 W/mK or more. Such a filler component may comprise a filler made of a material having a thermal conductivity of about 1 W/mK or more, 5 W/mK or more, 10 W/mK or more, or about 15 W/mK or more. In another example, the thermal conductivity of the material may be about 400 W/mK or less, 350 W/mK or less, or about 300 W/mK or less. The type of such a material is not particularly limited, which can be exemplified by, for example, a ceramic material such as aluminum oxide (alumina: $Al_2O_3$), aluminum nitride (AlN), boron nitride (BN), silicon nitride ($Si_3N_4$), silicon carbide (SiC), beryllium oxide (BeO), A ceramic material such as zinc oxide (ZnO), magnesium oxide (MgO) or boehmite.

The filler component may comprise various fillers if necessary, in addition to the thermally conductive filler as above, and for example, a carbon filler such as graphite, or a filler such as fumed silica, clay, aluminum hydroxide ($Al(OH)_3$), magnesium hydroxide ($Mg(OH)_2$) or calcium carbonate ($CaCO_3$), and the like may be applied.

In one example, the filler component may have a moisture content of about 1,000 ppm or less. The moisture content can be measured with a karl fishcer titrator (KR831) under conditions of 10% relative humidity and 5.0 or less drift. At this time, the moisture content may be an average moisture content with respect to the entire filler component used in the resin composition. In the present application, a filler component satisfying the above conditions may be selectively used, or the moisture content of the filler may be adjusted to satisfy the moisture content range by a method of drying the filler component to be used in an oven at a temperature of about 200° C., and the like. In another example, the upper limit of the moisture content of the filler component may be about 800 ppm or less, 600 ppm or less, or about 400 ppm or less, and the lower limit thereof may be about 100 ppm or more, or about 200 ppm or more.

As one example, the resin composition of the present application may be a room temperature curable composition. The room temperature curable composition means a composition in which the curing reaction of the resin composition starts at room temperature and proceeds at room temperature. As one example, the curing starts at room temperature immediately after the main resin and the curing agent are mixed at room temperature, and the curing proceeds in a state maintained at room temperature.

In one example, the resin composition may be an adhesive composition. The term adhesive composition is a composition capable of forming an adhesive before or after curing. The kind of the resin component contained in such a resin composition is not particularly limited.

In the present application, the scope of the term resin component includes not only a component generally known as a resin, but also a component that can be converted into a resin through a curing reaction or a polymerization reaction.

In one example, as the resin component, an adhesive resin or a precursor capable of forming an adhesive resin may be applied. An example of such a resin component includes an acrylic resin, an epoxy resin, a urethane resin, an olefin resin, an EVA (ethylene vinyl acetate) resin or a silicone resin, and the like, or a precursor such as a polyol or an isocyanate compound, and the like, but is not limited thereto.

In one example, the resin composition of the present application may be a one-component resin composition or a two-component resin composition. The two-component resin composition is separated into a main composition and a curing agent composition as is known, where these two separated compositions may be mixed and reacted to form a resin, and when the resin composition of the present application is a two-component type, the resin composition comprising the resin component and the filler component may refer to the main composition, the curing agent composition, a mixture thereof, or a state after mixing them and then performing the reaction.

In addition, when the resin composition is, for example, a two-component resin composition comprising a main composition and a curing agent composition, the main composition may comprise a silicone resin, a polyol resin, an epoxy resin or an acrylic resin as the main resin, and the curing agent composition may comprise, as the curing agent, a known curing agent suitable for the main resin. As one example, when the main resin is a silicone resin, a siloxane compound may be used as the curing agent; when the main resin is a polyol resin, an isocyanate compound may be used as the curing agent; when the main resin is an epoxy resin, an amine compound may be used as the curing agent, and when the main resin is an acrylic resin, an isocyanate compound may be used as the curing agent.

In one example, the resin composition may be a urethane resin composition, and may be a two-component urethane resin composition. The resin composition, which is a urethane resin composition, comprises a main resin and a curing agent, but may comprise a polyol as the main resin and may comprise an isocyanate as the curing agent. In addition, the term two-component urethane resin composition is a composition capable of forming a resin by formulating the main composition and the curing agent composition, where the polyurethane may be formed by the reaction of the main agent and the curing agent. In one example, the resin composition of the present application may refer to a main composition of a two-component urethane resin composition, a curing agent composition of a two-component urethane resin composition, or a mixture of the main and curing agent compositions, or a mixture in a state where a urethane resin is formed by a urethane reaction in the mixture.

The main composition of the two-component urethane-based resin composition may comprise at least a polyol, and the curing agent composition may comprise an isocyanate compound such as polyisocyanate.

In this case, the urethane resin formed by the reaction of the two-component urethane resin composition, that is, the polyurethane, may comprise at least the polyol-derived unit and the polyisocyanate-derived unit. In this case, the polyol-derived unit may be a unit formed by the urethane reaction of the polyol with the polyisocyanate, and the polyisocyanate-derived unit may be a unit formed by the urethane reaction of the polyisocyanate with the polyol.

As one example, the main resin and the curing agent may each exhibit a viscosity of about 10,000 cP or less. Specifically, the main resin and the curing agent may each have a viscosity upper limit of about 8,000 cP or less, 6,000 cP or less, 4,000 cP or less, 2,000 cP or about 1,000 cP or less. Preferably, the main resin and the curing agent may each have a viscosity upper limit of about 900 cP or less, 800 cP or less, 700 cP or less, 600 cP or less, 500 cP or less, or about 400 cP or less. Although not particularly limited, the main resin and the curing agent may have a viscosity lower limit of about 50 cP or more, or about 100 cP or more. If the viscosity is too low, processability may be good, but as the molecular weight of the raw material is lowered, the possibility of volatilization may increase and the adhesive force may be deteriorated, where this disadvantage can be prevented by satisfying the lower limit range. The viscosity may be measured at room temperature using, for example, a Brookfield LV type viscometer. Specifically, it may be measured using a Brookfield LV type viscometer at about 25° C. with a torque of about 90% and a shear rate of about 100 rpm.

In one example, the resin composition may be a two-component urethane resin composition. The two-component urethane resin composition may be cured by reacting a main resin comprising a polyol and the like with a curing agent comprising an isocyanate and the like at room temperature.

The curing reaction may be assisted by a catalyst, for example. Accordingly, the two-part urethane-based composition may include all a state where the main resin (polyol) and the curing agent (isocyanate) are separated, mixed, or reacted.

As the catalyst, for example, a tin-based catalyst may be used. As one example of the tin-based catalyst, dibutyltin dilaurate (DBTDL) may be used.

The two-component urethane-based composition may comprise a main resin comprising at least a polyol resin and a curing agent comprising at least an isocyanate, so that the cured product of the resin composition may comprise both the polyol-derived unit and the polyisocyanate-derived unit. At this time, the polyol-derived unit may be a unit formed by a urethane reaction of a polyol with a polyisocyanate, and the polyisocyanate-derived unit may be a unit formed by a urethane reaction of a polyisocyanate with a polyol.

In one example, an ester polyol resin may be used as the polyol resin included in the main material. When the ester polyol is used, it is advantageous to satisfy the above-described General Formula 3, and it is also advantageous to satisfy physical properties, such as adhesive force, to be described below.

Meanwhile, the ester polyol may be an amorphous or sufficiently low crystalline polyol. In this specification, the "amorphous" means a case where the crystallization temperature (Tc) and the melting temperature (Tm) are not observed in a DSC (differential scanning calorimetry) analysis to be described below. At this time, the DSC analysis can be performed at a rate of 10° C./minute within a range of −80° C. to 60° C., and for example, a method can be performed, in which the temperature is raised from 25° C. to 60° C. at the above rate, and then the temperature is reduced to −80° C. again and raised to 60° C. again. Here, the "sufficiently low crystalline" means a case where the melting point (Tm) observed in the DSC analysis is less than 15° C., which is about 10° C. or lower, 5° C. or lower, 0° C. or lower, −5° C. or lower, −10° C. or lower, or about −20° C. or lower or so. At this time, the lower limit of the melting point is not particularly limited, but for example, the melting point may be about −80° C. or higher, −75° C. or higher, or about −70° C. or higher. When the polyol is crystalline or has high (room temperature) crystallizability, such as not satisfying the melting point range, the viscosity difference depending on the temperature easily increases, so that it may be difficult to satisfy the above-described General Formula 3 or physical properties such as adhesive force to be described below.

In one example, as the ester polyol, for example, a carboxylic acid polyol or a caprolactone polyol may be used.

The carboxylic acid polyol may be formed by reacting a component comprising a carboxylic acid and a polyol (e.g., a diol or a triol, etc.), and the caprolactone polyol may be formed by reacting a component comprising caprolactone and a polyol (e.g., a diol or a triol, etc.). At this time, the carboxylic acid may be a dicarboxylic acid.

In one example, the polyol may be a polyol represented by the following formula 1 or 2.

[Formula 1]

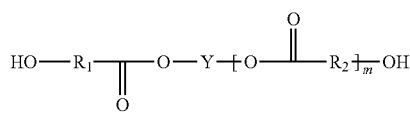

[Formula 2]

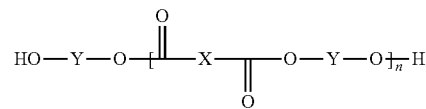

In Formulas 1 and 2, X is a carboxylic acid-derived unit, and Y is a polyol-derived unit. The polyol-derived unit may be, for example, a triol unit or a diol unit. In addition, n and m may be any number, and for example, n is a number in a range of 2 to 10, m is a number in a range of 1 to 10, and $R_1$ and $R_2$ are each independently an alkylene having 1 to 14 carbon atoms.

As used herein, the term "carboxylic acid-derived unit" may mean a moiety other than the carboxyl group in the carboxylic acid compound. Similarly, as used herein, the term "polyol-derived unit" may mean a moiety other than the hydroxyl group in the polyol compound structure.

That is, when the hydroxyl group of the polyol reacts with the carboxyl group of the carboxylic acid, the water ($H_2O$) molecule is eliminated by condensation reaction to form an ester bond. Thus, when the carboxylic acid forms the ester bond by the condensation reaction, the carboxylic acid-derived unit may mean a moiety of the carboxylic acid structure which does not participate in the condensation reaction. Furthermore, the polyol-derived unit may mean a moiety of the polyol structure which does not participate in the condensation reaction.

In addition, after the polyol forms an ester bond with caprolactone, Y in Formula 2 also represents a moiety excluding the ester bond. That is, when the polyol and the caprolactone form an ester bond, the polyol-derived unit in Formula 2, Y may mean a moiety of the polyol structure which does not participate in the ester bond. The ester bonds are represented in Formulas 1 and 2, respectively.

On the other hand, when the polyol-derived unit of Y in Formulas above is a unit derived from a polyol having three or more hydroxyl groups such as a triol unit, a branched structure may be realized in the Y part in the formula structure.

In Formula 1 above, the kind of the carboxylic acid-derived unit of X is not particularly limited, but in order to secure desired physical properties, it may be a unit derived from one or more compounds selected from the group consisting of a fatty acid compound, an aromatic compound having two or more carboxyl groups, an alicyclic compound having two or more carboxyl groups and an aliphatic compound having two or more carboxyl groups.

In one example, the aromatic compound having two or more carboxyl groups may be phthalic acid, isophthalic acid, terephthalic acid, trimellitic acid or tetrachlorophthalic acid.

In one example, the alicyclic compound having two or more carboxyl groups may be tetrahydrophthalic acid, hexahydrophthalic acid or tetrachlorophthalic acid.

Also, in one example, the aliphatic compound having two or more carboxyl groups may be oxalic acid, adipic acid, azelaic acid, sebacic acid, succinic acid, malic acid, glutaric acid, malonic acid, pimelic acid, suberic acid, 2,2-dimethylsuccinic acid, 3,3-dimethylglutaric acid, 2,2-dimethylglutaric acid, maleic acid, fumaric acid or itaconic acid.

From the viewpoint of a low glass transition temperature in the range to be described below, an aliphatic carboxylic acid-derived unit may be preferable to an aromatic carboxylic acid-derived unit.

On the other hand, in Formulas 1 and 2, the kind of the polyol-derived unit of Y is not particularly limited, but in order to secure desired physical properties, it may be derived from one or more compounds selected from the group consisting of an alicyclic compound having two or more hydroxyl groups and an aliphatic compound having two or more hydroxyl groups.

In one example, the alicyclic compound having two or more hydroxyl groups may be 1,3-cyclohexane dimethanol or 1,4-cyclohexane dimethanol.

Also, in one example, the aliphatic compound having two or more hydroxyl groups may be ethylene glycol, propylene glycol, 1,2-butylene glycol, 2,3-butylene glycol, 1,3-propanediol, 1,4-butanediol, 1,6-hexanediol, neopentyl glycol, 1,2-ethylhexyldiol, 1,5-pentanediol, 1,9-nonanediol, 1,10-decanediol, glycerin or trimethylol propane.

On the other hand, in Formula 1 above, n is any number, and the range may be selected in consideration of the desired physical properties of the resin composition or a resin layer, which is the cured product thereof. For example, n may be about 2 to 10 or 2 to 5.

Also, in Formula 2 above, m is any number, and the range may be selected in consideration of the desired physical properties of the resin composition or a resin layer, which is the cured product thereof. For example, m is about 1 to 10 or 1 to 5.

If n and m in Formulas 1 and 2 are outside the above ranges, the crystallizability expression of the polyol becomes stronger, which may adversely affect the injection processability of the composition.

In Formula 2, $R_1$ and $R_2$ are each independently an alkylene having 1 to 14 carbon atoms. The number of carbon atoms can be selected in consideration of the desired physical properties of the resin composition or a resin layer which is the cured product thereof.

The molecular weight of the polyol may be adjusted in consideration of the viscosity, durability or adhesion, and the like, as described below, which may be within a range of, for example, about 300 to about 2,000. Unless otherwise specified, in this specification, the "molecular weight" may be a weight average molecular weight (Mw) measured using GPC (gel permeation chromatograph). If it is out of the above range, the reliability of the resin layer after curing may be poor and problems related to volatile components may occur.

In the present application, the kind of the isocyanate contained in the curing agent is not particularly limited, but in order to secure desired physical properties, a non-aromatic isocyanate compound containing no aromatic group can be used. When an aromatic polyisocyanate is used, the reaction rate may be too fast and the glass transition temperature of the cured product may be increased, so that it may be difficult to satisfy the above-described General Formula 3 or physical properties such as adhesive force to be described below.

As the non-aromatic isocyanate compound, for example, an aliphatic polyisocyanate such as hexamethylene diisocyanate, trimethylhexamethylene diisocyanate, lysine diisocyanate, norbornane diisocyanate methyl, ethylene diisocyanate, propylene diisocyanate or tetramethylene diisocyanate; an alicyclic polyisocyanate such as transcyclohexane-1,4-diisocyanate, isophorone diisocyanate, bis(isocyanatomethyl)cyclohexane diisocyanate or dicyclohexylmethane diisocyanate; or one or more carbodiimide-modified polyisocyanates or isocyanurate-modified polyisocyanates of the foregoing; and the like may be used. Also, a mixture of two or more of the above-listed compounds may be used.

Meanwhile, the resin component included in the two-component resin composition may have a glass transition temperature (Tg) of less than 0° C. after curing. When the glass transition temperature range is satisfied, brittle characteristics can be secured in a relatively short time even at a low temperature where the battery module or the battery pack can be used, thereby ensuring impact resistance and vibration resistance characteristics. On the other hand, if the above range is not satisfied, the tacky property of the cured product may be excessively high or the thermal stability may be lowered. In one example, the lower limit of the glass transition temperature of the two-component resin composition after curing may be about −70° C. or more, −60° C. or more, −50° C. or more, −40° C. or more, or about −30° C. or more, and the upper limit thereof may be about −5° C. or less, −10° C. or less, −15° C. or less, or about −20° C. or less.

In the present application, the expression "after curing" may be used in the same meaning as "real curing". The real curing means a state that in order to manufacture a battery module, the resin composition injected into the module can be regarded as having been cured enough to function as an adhesive imparted with a function such as actual heat dissipation. Taking a urethane resin as an example, the real curing can be confirmed from the fact that a conversion rate based on the NCO peak around 2250 $cm^{-1}$ is 80% or more, which is determined by a FT-IR analysis on the basis of the curing at room temperature and 30 to 70% relative humidity for 24 hours.

Meanwhile, the ratio of the polyol resin component and the polyisocyanate component in the resin composition is not particularly limited, which may be appropriately adjusted to enable a urethane reaction between them.

As one example, the resin composition of the present application may have a viscosity value of about 500,000 cP or less. The lower limit may be, for example, about 150,000 cP or more. As one example, the viscosity value of the resin composition may be about 450,000 cP or less, 400,000 cP or less, or about 350,000 cP or less, and may be about 160,000 cP or more, 180,000 cP or more, or about 200,000 cP or more.

Meanwhile, when the viscosity of the resin composition is measured in a shear rate range of 0.01 to 10.0/s using a rheological property measuring device (ARES) within 1 minute at room temperature after the curing reaction is started by mixing the main resin composition and the curing agent composition, it may be a viscosity value measured at a point of 2.5/s.

When the resin composition satisfies the viscosity in the above range, it is advantageous to satisfy the above-described General Formula 3, whereby the handleability of the resin composition can be improved.

The resin composition may further comprise a viscosity controlling agent, such as a thixotropic agent, a diluent, a dispersant, a surface treatment agent or a coupling agent, for adjusting viscosity, if necessary, for example, for raising or lowering viscosity or for controlling viscosity depending on shear force.

The thixotropic agent controls the viscosity of the resin composition depending on the shear force, whereby the process of manufacturing the battery module can be effectively performed. As the usable thixotropic agent, fumed silica and the like can be exemplified.

The diluent or dispersant is usually used for lowering the viscosity of the resin composition, and any of various kinds known in the art can be used without limitation as long as it can exhibit the above action.

The surface treatment agent is for surface treatment of the filler introduced into the resin layer, and any of various kinds known in the art can be used without limitation as long as it can exhibit the above action.

The coupling agent may be used, for example, to improve the dispersibility of the thermally conductive filler such as alumina, and any of various kinds known in the art may be used without limitation as long as it can exhibit the above action.

In addition, the resin composition may further comprise a flame retardant or a flame retardant auxiliary agent. In this case, a known flame retardant may be used without any particular limitation, and for example, a flame retardant in the form of a solid phase or a liquid flame retardant may be applied. The flame retardant includes, for example, organic flame retardants such as melamine cyanurate and inorganic flame retardants such as magnesium hydroxide. When the amount of the filler filled in the resin layer is large, a liquid type flame retardant material (TEP, triethyl phosphate, or TCPP, tris(1,3-chloro-2-propyl)phosphate, etc.) may also be used. In addition, a silane coupling agent capable of acting as a flame retardant synergist may also be added.

The resin composition may comprise the above-described constitutions, and may be a solvent type composition, a water-based composition or a solventless type composition, but considering the convenience of the manufacturing process, the solventless type may be suitable.

The resin composition of the present application may have physical properties suitable for the use to be described below.

In one example, the resin composition may have a leakage current of less than about 1 mA as measured at room temperature 60 minutes after the main resin composition and the curing agent composition initiate a curing reaction. The lower limit of the leakage current is not particularly limited, but considering the composition of the resin composition and the like, it may be about 0.01 mA or more, 0.02 mA or more, 0.03 mA or more, or about 0.05 mA or more. The leakage current was measured according to ISO 6469-3. When the range of the leakage current is satisfied, the resin layer formed after the resin composition is cured has excellent electrical insulation properties. Therefore, the performance of the battery module can be maintained and stability can be secured. Such a leakage current can also be controlled by adjusting the components of the resin composition, and for example, the leakage current can be controlled by applying an insulating filler in the resin composition. In general, the above-described ceramic filler among thermally conductive fillers is known as a component capable of securing insulation properties.

In one example, the resin composition may have adhesive force (S1) of about 200 gf/10 mm or more of the resin composition measured at room temperature 24 hours after the main resin composition and the curing agent composition initiate the curing reaction. That is, it may mean adhesive force of the resin composition after curing. In another example, the adhesive force may be about 220 gf/10 mm or more, 250 gf/10 mm or more, 300 gf/10 mm or more, 350 gf/10 mm or more, 400 gf/10 mm or more, 420 gf/10 mm or more, 440 gf/10 mm or more, or about 460 gf/10 mm or more. When the adhesive force satisfies the above range, the battery module can secure appropriate impact resistance and vibration resistance. The upper limit of the adhesive force is not particularly limited, which may be about 1,000 gf/10 mm or less, 900 gf/10 mm or less, 800 gf/10 mm or less or 700 gf/10 mm or less, 600 gf/10 mm or less, or about 500 gf/10 mm or less or so. When the adhesive force is too high, there is a risk that the pouch portion to which the resin layer formed after the resin composition is cured is attached will tear. Specifically, in the case where a shock occurs in which the shape of the battery module is deformed due to an accident while driving the automobile, when the battery cell is attached too strongly through the resin layer, dangerous materials inside the battery can be exposed or explode, while the pouch is torn. The adhesive force can be measured with respect to an aluminum pouch. For example, an aluminum pouch used for manufacturing a battery cell is cut to a width of about 10 mm, a resin composition is loaded on a glass plate, and the cut aluminum pouch is loaded thereon so that the resin composition contacts the PET (poly (ethylene terephthalate) surface of the pouch, and then the adhesive force can be measured while the resin composition is cured at 25° C. and 50% RH for 24 hours and the aluminum pouch is peeled off at a peeling angle of 1800 and a peeling speed of 300 mm/min with a tensile tester (Texture analyzer).

In another example, the adhesive force of the resin composition after curing can be maintained at a considerable level even under high-temperature/high-humidity. Specifically, in the present application, the % ratio [(S2/S1)×100] of the adhesive force (S2) measured by the same method after a high-temperature/high-humidity acceleration test performed under predetermined conditions relative to the adhesive force (S1) measured at room temperature may be about 70% or more, or about 80% or more. In one example, the high-temperature/high-humidity acceleration test can be measured after storing the same specimen as the specimen used for measuring the room temperature adhesive force for 10 days under conditions of a temperature of 40° C. to 100° C. and humidity of 75% relative humidity (RH) or more. When the adhesive force and the relationship are satisfied, excellent adhesion durability can be maintained even if the use environment of the battery module changes.

In one example, the resin composition can have excellent heat resistance after curing. In this regard, the composition of the present application may have a 5% weight loss temperature of 120° C. or higher at the time of a thermogravimetric analysis (TGA) measured for the cured product of only the resin components in a state of comprising no filler. In addition, the composition of the present application may have an 800° C. balance of about 70 weight % or more at the time of a thermogravimetric analysis (TGA) measured for the cured product of the resin composition in a state of comprising the filler. In another example, the 800° C. balance may be about 75 weight % or more, 80 weight % or more, 85 weight % or more, or about 90 weight % or more. In another example, the 800° C. balance may be about 99 weight % or less. At this time, the thermogravimetric analysis (TGA) can be measured within a range of 25° C. to 800° C. at a temperature raising rate of 20° C./minute under a nitrogen ($N_2$) atmosphere of 60 $cm^3$/minute. The heat resistance characteristics related to the thermogravimetric analysis (TGA) can be secured by controlling the kind of the resin and/or the filler or the content thereof.

The present application also relates to a battery module. The module comprises a module case and a battery cell. The battery cell may be housed in the module case. One or more battery cells may be present in the module case, and a plurality of battery cells may be housed in the module case. The number of battery cells housed in the module case is adjusted depending on applications and the like, which is not particularly limited. The battery cells housed in the module case may be electrically connected to each other.

The module case may comprise at least sidewalls and a bottom plate which form an internal space in which the battery cell can be housed. Also, the module case may further comprise a top plate for sealing the internal space. The sidewalls, the bottom plate, and the top plate are integrally formed with each other, or the sidewalls, the bottom plate, and/or the top plate as separated from each other are assembled, so that the module case can be formed. The shape and size of such a module case are not particularly limited and may be appropriately selected depending on applications, or the type and number of the battery cell housed in the internal space, and the like.

Here, since there are at least two plates constituting the module case, the term top plate and bottom plate are terms having relative concepts used to distinguish them. That is, it does not mean that in the actual use state, the top plate necessarily exists at the upper portion and the bottom plate necessarily exists at the lower portion.

FIG. 3 is a view showing an exemplary module case (10), which is an example of a box-shaped case (10) comprising one bottom plate (10a) and four sidewalls (10b). The module case (10) may further comprise a top plate (10c) sealing the internal space.

FIG. 4 is a schematic view of the module case (10) of FIG. 3, as observed from above, in which the battery cells (200) are housed.

A hole may be formed in the bottom plate, the sidewalls, and/or the top plate of the module case. When a resin layer is formed by an injection process, the hole may be an injection hole used for injecting a material for forming the resin layer, that is, the above-described resin composition. The shape, number and position of the hole can be adjusted in consideration of the injection efficiency of the material for forming the resin layer. In one example, the hole may be formed at least on the bottom plate and/or the top plate.

An observation hole may be formed at the end of the top plate and the bottom plate, and the like where the injection hole is formed. For example, when the material of the resin layer is injected through the injection hole, such an observation hole may be formed for observing whether the injected material is injected well to the end of the sidewalls, the bottom plate, or the top plate. The position, shape, size, and number of the observation hole are not particularly limited as long as they are formed so that it can be confirmed whether the injected material is properly injected.

The module case may be a thermally conductive case. The term thermally conductive case means a case in which the thermal conductivity of the entire case is 10 W/mK or more, or at least a portion having the thermal conductivity as above is included. For example, at least one of the sidewalls, the bottom plate and the top plate as described above may have the thermal conductivity described above. In another example, at least one of the sidewalls, the bottom plate, and the top plate may comprise a portion having the thermal conductivity. For example, the battery module of the present application may comprise a first cured resin layer in contact with the top plate and the battery cell, and a second cured resin layer in contact with the bottom plate and the battery cell, where at least the second cured resin layer may be a thermally conductive resin layer. Accordingly, it can be said that at least the bottom plate may have thermal conductivity or may comprise a thermally conductive portion.

Here, the thermal conductivity of: the thermally conductive top plate, bottom plate, sidewalls; or the thermally conductive portion may be about 20 W/mK or more, 30 W/mK or more, 40 W/mK or more, 50 W/mK or more, 60 W/mK or more, 70 W/mK or more, 80 W/mK or more, 90 W/mK or more, 100 W/mK or more, 110 W/mK or more, 120 W/mK or more, 130 W/mK or more, 140 W/mK or more, 150 W/mK or more, 160 W/mK or more, 170 W/mK or more, 180 W/mK or more, 190 W/mK or more, or about 195 W/mK or more. The higher the value of the thermal conductivity is, the more advantageous it is from the viewpoint of the heat dissipation property of the module, and the like, and the upper limit is not particularly limited. In one example, the thermal conductivity may be about 1,000 W/mK or less, 900 W/mK or less, 800 W/mK or less, 700 W/mK or less, 600 W/mK or less, 500 W/mK or less, 400 W/mK or less, 300 W/mK or less, or about 250 W/mK or less, but is not limited thereto. The kind of materials exhibiting the thermal conductivity as above is not particularly limited, and for example, includes metal materials such as aluminum, gold, silver, tungsten, copper, nickel, or platinum. The module case may be comprised entirely of the thermally conductive material as above, or at least a part of the module case may be a portion comprised of the thermally conductive material. Accordingly, the module case may have the above-mentioned range of thermal conductivity, or comprise at least one portion having the aforementioned thermal conductivity.

In the module case, the portion having a thermal conductivity in the above range may be a portion in contact with the resin layer and/or the insulating layer. In addition, the portion having the thermal conductivity may be a portion in contact with a cooling medium such as cooling water. When it has such a structure, heat generated from the battery cell can be effectively discharged to the outside.

In the present application, the term battery cell means a single unit secondary battery configured by including an electrode assembly and a casing.

The type of the battery cell housed in the battery module case is not particularly limited, and a variety of known battery cells may be applied. In one example, the battery cell may be a pouch type.

The battery module of the present application may further comprise a resin layer. Specifically, the battery module of the present application may comprise a cured resin layer in which the filler-containing composition is cured. The cured resin layer may be formed from the resin composition as described above.

The battery module may comprise, as the resin layer, a first cured resin layer in contact with the top plate and the battery cell, and a second cured resin layer in contact with the bottom plate and the battery cell. One or more of the first and second cured resin layers may comprise a cured product of the resin composition as described above, thereby having the predetermined adhesive force, cold resistance, heat resistance, and insulation properties as described above.

In addition, the first and second cured resin layers are thermally conductive resin layers, and the thermal conductivity of the resin layer is about 3 W/mK or more, as described above. Meanwhile, the bottom plate, the top plate and/or the sidewalls, and the like to which the resin layer is attached may be a portion having the above-described thermal conductivity of 10 W/mK or more. At this time, the module case portion representing the thermal conductivity may be a part in contact with a cooling medium, for example, cooling water or the like.

Furthermore, the resin layer may be a flame retardant resin layer. In the present application, the term flame retardant resin layer may mean a resin layer showing a V-0 rating in UL 94 V Test (vertical burning test). This can secure stability against fires and other accidents that may occur in the battery module.

In the battery module of the present application, at least one of the sidewalls, the bottom plate and the top plate in contact with the resin layer may be the above-described thermally conductive sidewalls, bottom plate or top plate. On the other hand, in this specification, the term contact may also mean a case where, for example, the top plate, the bottom plate and/or the sidewall; or the battery cell is in direct contact with the resin layer, or another element, for example, an insulating layer or the like exists therebetween. In addition, the resin layer in contact with the thermally conductive sidewalls, bottom plate or top plate may be in thermal contact with the target. At this time, the thermal contact may mean a state that the resin layer is in direct contact with the bottom plate or the like, or other elements, for example, an insulating layer or the like as described below, between the resin layer and the bottom plate or the like are present, but the other element does not interfere with heat transfer from the battery cell to the resin layer, and from the resin layer to the bottom plate or the like. Here, the phrase "does not interfere with heat transfer" means the case that even when other elements (e.g., an insulating layer) exists between the resin layer and the bottom plate or the like, the total thermal conductivity of the other elements and the resin layer is about 1.5 W/mK or more, 2 W/mK or more, 2.5 W/mK or more, 3 W/mK or more, 3.5 W/mK or more, or about 4 W/mK or more, or the total thermal conductivity of the resin layer and the bottom plate or the like in contact therewith is included in the range even when the other elements are present. The thermal conductivity of the thermal contact may be about 50 W/mK or less, 45 W/mK or less, 40 W/mK or less, 35 W/mK or less, 30 W/mK or less, 25 W/mK or less, 20 W/mK or less, 15 W/mK or less, 10 W/mK or less, 5 W/mK or less, 4.5 W/mK or less, or about 4.0 W/mK or less. This thermal contact can be achieved by controlling the thermal conductivity and/or the thickness of the other element when the other element is present.

The thermally conductive resin layer may be in thermal contact with the bottom plate or the like and may also be in thermal contact with the battery cell. By adopting such a structure, various fastening parts or cooling equipment of the module, and the like, which was previously required in the construction of a general battery module or a battery pack as an assembly of such modules, is greatly reduced, and simultaneously it is possible to implement a module in which heat dissipation characteristics are ensured and more battery cells are housed per unit volume. Accordingly, the present application can provide a battery module having high power while being more compact and lighter.

In one example, the battery module may further comprise an insulating layer between the module case and the battery cell or between the resin layer and the module case. By adding an insulating layer, it is possible to prevent problems such as an electrical short phenomenon or a fire due to a contact between the cell and the case by an impact that may occur during use. The insulating layer may be formed using an insulating sheet having high insulation and thermal conductivity, or may be formed by applying or injecting a material exhibiting insulating properties. For example, a process of forming an insulating layer may be performed before the injection of the resin composition. A so-called TIM (thermal interface material) or the like may be applied in forming the insulating layer. Alternatively, the insulating layer may be formed of an adhesive material, and for example, the insulating layer may also be formed using a resin layer having little or no filler such as thermally conductive fillers. As the resin component which can be used for forming the insulating layer, an acrylic resin, PVC (poly(vinyl chloride)), an olefin resin such as PE (polyethylene), an epoxy resin, silicone or a rubber component such as an EPDM (ethylene propylene diene monomer) rubber, and the like can be exemplified, without being limited thereto. The insulating layer may have an insulation breakdown voltage, as measured according to ASTM D149, of about 5 kV/mm or more, 10 kV/mm or more, 15 kV/mm or more, 20 kV/mm or more, 25 kV/mm or more, or about 30 kV/mm or more. The higher the value of the dielectric breakdown voltage is, the better the insulation shows, and thus it is not particularly limited. For example, the dielectric breakdown voltage of the insulating layer may be about 100 kV/mm or less, 90 kV/mm or less, 80 kV/mm or less, 70 kV/mm or less, or about 60 kV/mm or less. The thickness of the insulating layer can be set to an appropriate range in consideration of the insulating property and the thermal conductivity of the insulating layer, and the like, and for example, may be about 5 µm or more, 10 µm or more, 20 µm or more, 30 µm or more, 40 µm or more, 50 µm or more, 60 µm or more, 70 µm or more, 80 µm or more, or about 90 µm or more or so. In addition, the upper limit of the thickness is not particularly limited and may be, for example, about 1 mm or less, 200 µm or less, 190 µm or less, 180 µm or less, 170 µm or less, 160 µm or less, or about 150 µm or less.

The present application also relates to a battery pack, for example, a battery pack comprising two or more battery modules as described above. In the battery pack, the battery modules may be electrically connected to each other. A method of electrically connecting two or more battery modules to constitute a battery pack is not particularly limited, and all known methods can be applied thereto.

The present application also relates to a device comprising the battery module or the battery pack. An example of the device may include an automobile such as an electric vehicle, but is not limited thereto, which may include all applications requiring a secondary battery as power. For example, a method of constructing the automobile using the battery pack is not particularly limited, and a general method may be applied.

Advantageous Effects

According to one example of the present application, the lifespan of the injection equipment for injecting the resin composition into the battery module is improved, and the resin composition having an excellent thermal conductivity after curing is provided.

EXPLANATION OF REFERENCE NUMERALS

Figure 1:
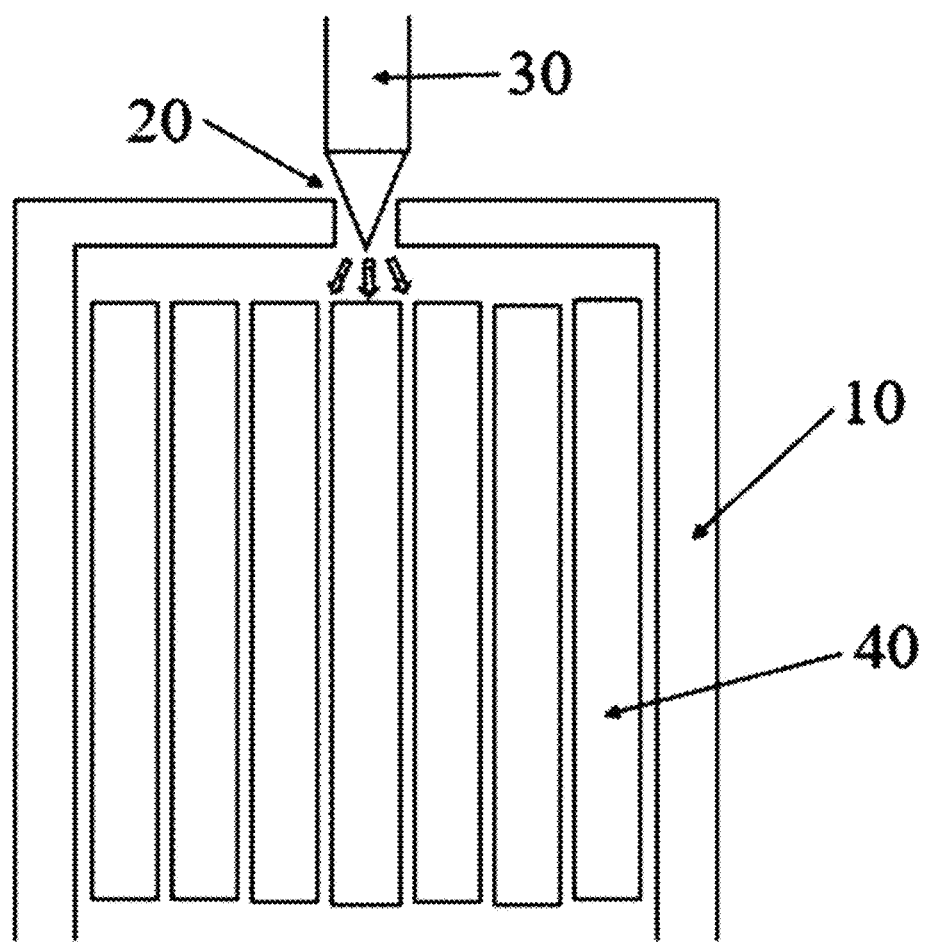
FIG. 1 is a diagram for exemplarily explaining a process of injecting a resin composition.

1: equipment
2, 2a, 2b: cartridge
3, 3a, 3b: pressurizing means
4, 4a, 4b: first discharge part
5: static mixer
6, 6a, 6b: receiving part 7: second discharge part
10: module case
10a: bottom plate
10b: sidewall
10c: top plate
200, 40: battery cell
30: injection equipment
20: injection hole
60: solid matter generating device
61: syringe
62: discharge part of syringe
63: filter
64: pressurizing means

MODE FOR INVENTION

Hereinafter, the present application will be described in detail through Examples, but the scope of the present application is not limited by Examples below.

1. Thermal Conductivity

The thermal conductivity of the resin layer (layer of the cured product of the resin composition) was measured by a hot-disk method according to ISO 22007-2 standard. Specifically, the resin compositions, which were mixtures of main compositions and curing agent compositions prepared in Examples and Comparative Examples, were each placed in a mold having a thickness of about 7 mm or so, and the thermal conductivity was measured in the through plane direction using the HOT DISK® equipment. As stipulated in the above standard (ISO 22007-2), the HOT DISK® equipment is an equipment that can check the thermal conductivity by measuring the temperature change (electrical resistance change) while the sensor with the nickel wire double spiral structure is heated, and the thermal conductivity was measured according to this standard.

2. Evaluation of Load Values

Figure 2:
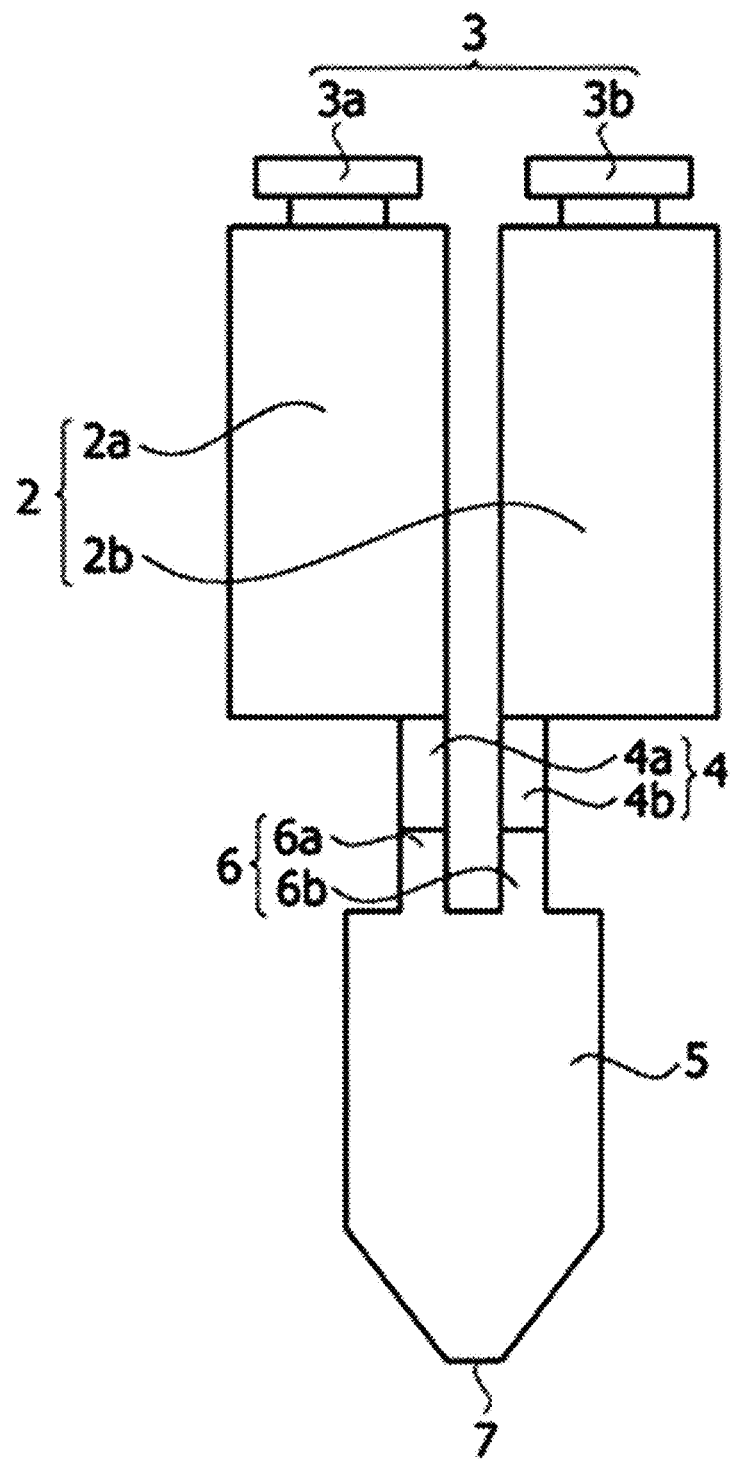
FIG. 2 shows an exemplary mixing machine, which can be applied in the present application.
Figure 3:
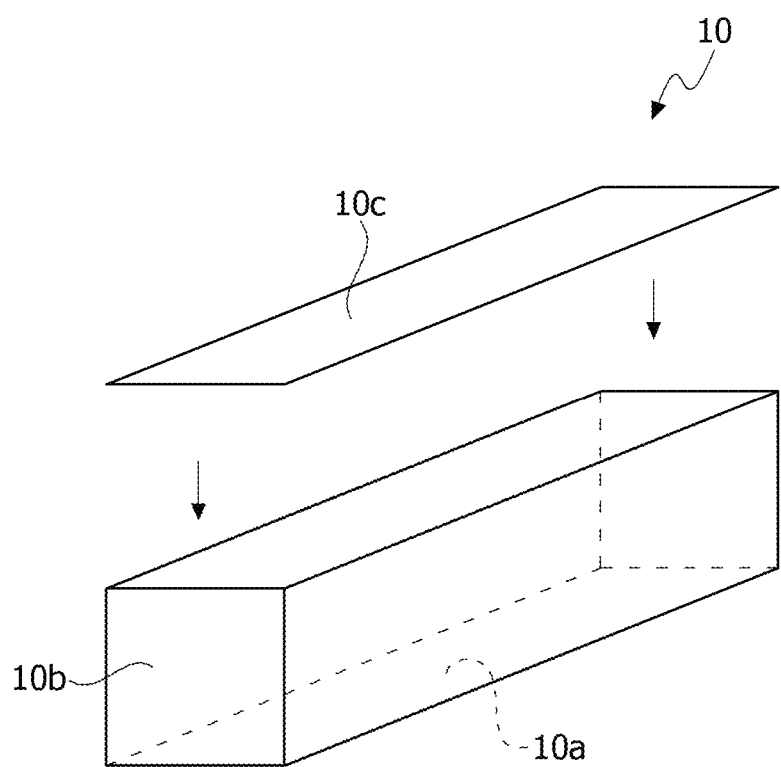
FIG. 3 shows an exemplary module case, which can be applied in the present application.
Figure 4:
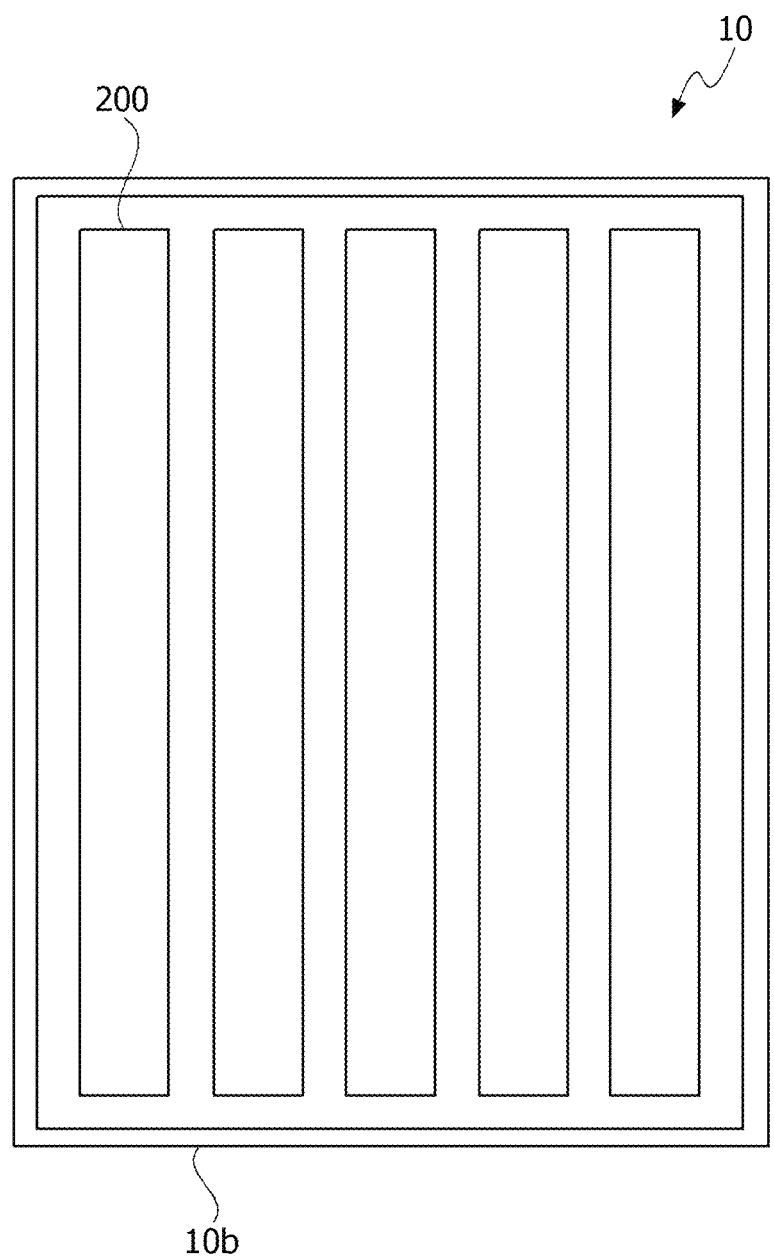
FIG. 4 schematically shows a form in which battery cells are housed in a module case.

The load value (kgf) of the resin composition was measured using the equipment (1) in which two cartridges (2, 2a, 2b) and one static mixer (5) were connected as shown in FIG. 2.

In the equipment (1) of FIG. 2, as the cartridge (2, 2a, 2b), a cartridge (SULZER, AB050-01-10-01) including a material injection part of a circle with a diameter of 18 mm and a first discharge part (4, 4a, 4b) of a circle with a diameter of 3 mm, and having a height of 100 mm and an internal volume of 25 ml was used. As the static mixer (5), a stepped type static mixer (SULZER, MBH-06-16T) including a second discharge part (7) of a circle with a diameter of 2 mm and having an element number of 16 was used.

In addition, as the pressurizing means (3, 3a, 3b) (means for pushing the composition loaded in the cartridge) of the equipment of FIG. 2, a TA (Texture analyzer) was used.

By loading a main composition into any one of two cartridges (2, 2a, 2b), loading a curing agent composition into the other cartridge, and then applying the constant force to the pressurizing means (3, 3a, 3b), the main and curing agent compositions were mixed in the static mixer (5) via the first discharge part (4, 4a, 4b), and then the load value was measured while being discharged to the second discharge part (7).

Specifically, the main and curing agent compositions loaded into the two cartridges (2, 2a, 2b), respectively, were pressurized with a pressurizing mean (TA (Texture analyzer)) (3, 3a, 3b) at a constant speed of 1 mm/s, and injected into the static mixer (5), and from the time when the main and curing agent compositions injected into the mixer (5) were mixed in the mixer (5) and first discharged from the discharge part (7), the force applied to the pressurizing means was measured and simultaneously, the force of the maximum value at the point where the force become the maximum value was designated as the load value (Li). That is, when the force applied to the TA is measured in the above manner, usually, the force continuously increases and then decreases, or it shows the tendency that the increased force no longer increases, where the load value is the maximum force before the decrease or the maximum force at the point that it no longer increases.

3. Hardness Measurement of Solid Matter

Figure 5:
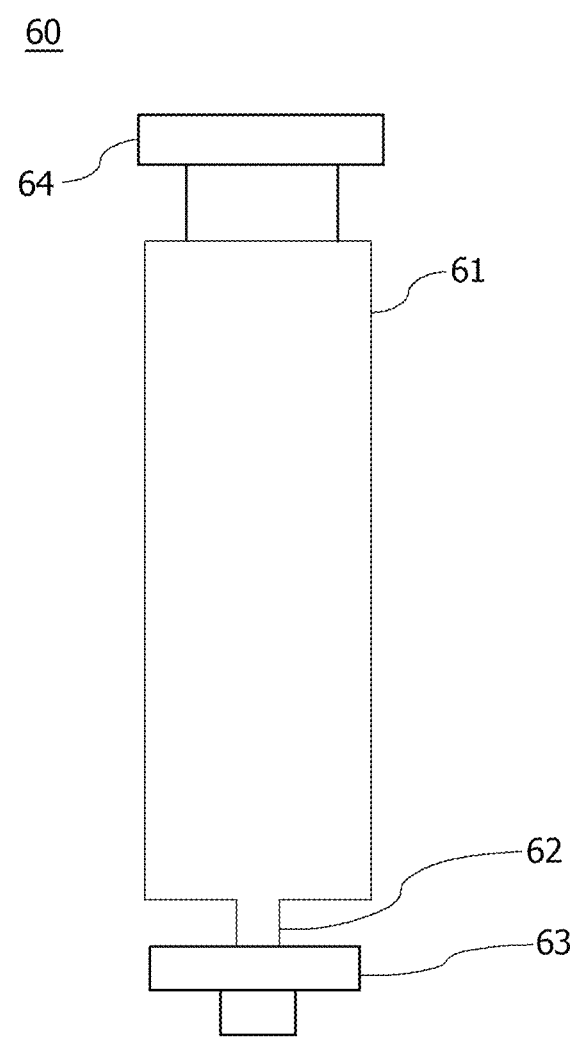
FIG. 5 shows an exemplary solid matter generating device, which can be applied in the present application.

The hardness of the solid matter of the resin composition was measured for the solid matter produced using a solid matter generating device (60) configured by combining a syringe and a filter as in FIG. 5.

In the solid matter generating device configured as in FIG. 5, as the syringe (61), a syringe including a resin injection part of a circle with a diameter of about 25 mm and a discharge part (62) of a circle with a diameter of about 8 mm, and having a height of about 80 mm and an internal volume of about 25 ml was used. In addition, as the filter (63), WHATMAN™'s PTEF filter (pore size: 0.45 μm, diameter: 13 mm) was used.

In the configuration as in FIG. 5, a TA (Texture analyzer) was applied as the pressurizing means (64). When the main resin compositions or the curing agent compositions prepared in Examples and Comparative Examples were each filled in the syringe (61), and a pressure of 5 bar was applied to the pressurizing means (64) for 16 hours, a solid matter of the resin composition was generated inside the discharge part (62) combined with the filter (63), and for the same, hardness was measured.

The solid matter generated inside the discharge part was collected to have a cylindrical shape with a diameter of about 2 mm and a height of about 2 mm, and for the same, hardness was measured. Specifically, when the collected solid matter was pressurized at a constant speed of 0.3 mm/s for the hardness of the solid matter, the force applied to the pressurizing means started to be measured from the time that the solid matter was pressurized, and the force (gf) applied to the pressurizing means at the time of elapsing about 0.5 seconds from the time of pressurization was obtained as the hardness of the solid matter. The TA (Texture analyzer) was used as the pressurizing means.

4. Measurement of Average Particle Diameter

The average particle diameter of the filler mentioned in this specification is the D50 particle diameter of the filler, which is a particle diameter measured by Marvern's MASTERSIZER3000 equipment in accordance with ISO-13320 standard. Upon the measurement, ethanol was used as a solvent. The incident laser is scattered by the fillers dispersed in the solvent, and the values of the intensity and directionality of the scattered laser vary depending on the size of the filler, which are analyzed using the Mie theory, whereby the D50 particle diameter can be obtained. Through the above analysis, the distribution can be obtained through conversion to the diameter of a sphere having the same volume as the dispersed fillers, and the particle diameter can be evaluated by obtaining the D50 value, which is the median value of the distribution.

5. Sphericity Evaluation of Filler

The sphericity of a filler, which is a three-dimensional particle, is defined as the ratio (S'/S) of the surface area (S) of the particle and the surface area (S') of a sphere having the same volume as that of the particle, and for real particles, it is usually an average value of circularity.

The circularity is the ratio of the boundary (P) of the image obtained from the two-dimensional image of the particle and the boundary of a circle having the same image and the same area (A), which is theoretically obtained by the following equation, and a value from 0 to 1, where for an ideal circle, the circularity is 1.

Circularity=$4\pi A/P^2$                            <Circularity Equation>

In this specification, the sphericity is an average value of circularity measured by Marvern's particle shape analysis equipment (FPIA-3000).

Example 1

A resin composition was prepared in a two-component type using the following materials.

The main resin was a caprolactone polyol represented by the following formula 2, wherein the number of repeating units (m in Formula 2) is at a level of about 1 to 3 or so, $R_1$ and $R_2$ are each alkylene having 4 carbon atoms, and as the polyol-derived unit (Y in Formula 3), a polyol containing a 1,4-butanediol unit was used.

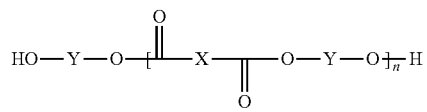

[Formula 2]

As a curing agent, polyisocyanate (HDI, hexamethylene diisocyanate) was used.

A filler component was prepared by mixing a first alumina filler (spherical, sphericity 0.95 or more) having an average particle diameter of about 70 μm, a second alumina filler (spherical, sphericity 0.95 or more) having an average particle diameter of about 20 μm and a third alumina filler (non-spherical, sphericity less than 0.9) having an average particle diameter of about 2 μm. The weight ratio at the time of mixing was 3:1:1 (first alumina filler: second alumina filler: third alumina filler) or so.

Therefore, the value of General Formula 1 above in the filler component is about 3, and the value of General Formula 2 above is about 1. In addition, when the total weight of the filler component is set to 100 weight %, the filler component comprises about 55 weight % of the alpha phase. The alpha phase was obtained by performing the XRD analysis on the filler component.

The main composition was prepared by uniformly mixing the main resin and the filler component with a planetary mixer. In addition, the curing agent composition was prepared by uniformly mixing the curing agent and the filler component with a planetary mixer.

Upon the preparation of the main and curing agent compositions, the main resin and the curing agent were used in an equivalent ratio of 1:1. The filler component in an amount such that about 87.6 parts by weight of the filler component was present in 100 parts by weight of the resin composition in which the main and curing agent compositions were mixed, was divided into two equal weights and blended into each of the main and curing agent compositions.

Example 2

As the filler component, a mixture of a first alumina filler (spherical, sphericity 0.95 or more) having an average particle diameter of about 70 μm, a second alumina filler (spherical, sphericity 0.95 or more) having an average particle diameter of about 20 μm and a third alumina filler (non-spherical, sphericity less than 0.9) having an average particle diameter of about 2 m, wherein the weight ratio (first alumina filler: second alumina filler: third alumina filler) between the fillers was about 30:15:10, was used.

The value of General Formula 1 above for the filler component is about 2, and the value of General Formula 2 above is about 1.5. In addition, when the total weight of the filler component is set to 100 weight %, the filler component comprises about 55 weight % of the alpha phase. The alpha phase was obtained by performing the XRD analysis on the filler component.

The main and curing agent compositions were prepared in the same manner as in Example 1 using the filler component, except that the filler component in an amount such that about 88.7 parts by weight of the filler component was present in 100 parts by weight of the resin composition in which the main and curing agent compositions were mixed, was divided into two equal weights and blended into each of the main and curing agent compositions.

Example 3

As the filler component, a mixture of a first alumina filler (spherical, sphericity 0.95 or more) having an average particle diameter of about 70 μm, a second alumina filler (spherical, sphericity 0.95 or more) having an average particle diameter of about 20 μm and a third alumina filler (non-spherical, sphericity less than 0.9) having an average particle diameter of about 2 m, wherein the weight ratio (first alumina filler: second alumina filler: third alumina filler) between the fillers was about 25:5:10, was used.

The value of General Formula 1 above for the filler component is about 5, and the value of General Formula 2 above is about 0.5. In addition, when the total weight of the filler component is set to 100 weight %, the filler component comprises about 55 weight % of the alpha phase. The alpha phase was obtained by performing the XRD analysis on the filler component.

The main and curing agent compositions were prepared in the same manner as in Example 1 using the filler component, except that the filler component in an amount such that about 88.7 parts by weight of the filler component was present in 100 parts by weight of the resin composition in which the main and curing agent compositions were mixed, was divided into two equal weights and blended into each of the main and curing agent compositions.

Example 4

As the filler component, a mixture of a first alumina filler (spherical, sphericity 0.95 or more) having an average particle diameter of about 65 μm, a second alumina filler (spherical, sphericity 0.95 or more) having an average particle diameter of about 20 μm and a third alumina filler (non-spherical, sphericity less than 0.9) having an average particle diameter of about 2 μm, wherein the weight ratio (first alumina filler: second alumina filler: third alumina filler) between the fillers was about 3:1:1, was used.

The value of General Formula 1 above for the filler component is about 3, and the value of General Formula 2 above is about 1. In addition, when the total weight of the filler component is set to 100 weight %, the filler component comprises about 55 weight % of the alpha phase. The alpha phase was obtained by performing the XRD analysis on the filler component.

The main and curing agent compositions were prepared in the same manner as in Example 1 using the filler component, except that the filler component in an amount such that about 88.7 parts by weight of the filler component was present in 100 parts by weight of the resin composition in which the main and curing agent compositions were mixed, was divided into two equal weights and blended into each of the main and curing agent compositions.

Example 5

As the filler component, a mixture of a first alumina filler (spherical, sphericity 0.95 or more) having an average particle diameter of about 120 μm, a second alumina filler (spherical, sphericity 0.95 or more) having an average particle diameter of about 20 μm and a third alumina filler (non-spherical, sphericity less than 0.9) having an average particle diameter of about 2 μm, wherein the weight ratio (first alumina filler: second alumina filler: third alumina filler) between the fillers was about 3:1:1, was used.

The value of General Formula 1 above for the filler component is about 3, and the value of General Formula 2 above is about 1. In addition, when the total weight of the filler component is set to 100 weight %, the filler component comprises about 55 weight % of the alpha phase. The alpha phase was obtained by performing the XRD analysis on the filler component.

The main and curing agent compositions were prepared in the same manner as in Example 1 using the filler component, except that the filler component in an amount such that about 88.7 parts by weight of the filler component was present in 100 parts by weight of the resin composition in which the main and curing agent compositions were mixed, was divided into two equal weights and blended into each of the main and curing agent compositions.

Comparative Example 1

As the filler component, a mixture of a first alumina filler having an average particle diameter of about 70 μm, a second alumina filler having an average particle diameter of about m and a third alumina filler having an average particle diameter of about 2 μm, wherein the weight ratio (first alumina filler: second alumina filler: third alumina filler) between the fillers was about 13:10:10, was used.

The value of General Formula 1 above for the filler component is about 1.3, and the value of General Formula 2 above is about 1.

The main and curing agent compositions were prepared in the same manner as in Example 1 using the filler component, except that the filler component in an amount such that about 88.7 parts by weight of the filler component was present in 100 parts by weight of the resin composition in which the main and curing agent compositions were mixed, was divided into two equal weights and blended into each of the main and curing agent compositions.

Comparative Example 2

As the filler component, a mixture of a first alumina filler having an average particle diameter of about 70 μm, a second alumina filler having an average particle diameter of about m and a third alumina filler having an average particle diameter of about 2 μm, wherein the weight ratio (first alumina filler: second alumina filler: third alumina filler) between the fillers was about 12:4:10, was used.

The value of General Formula 1 above for the filler component is about 3, and the value of General Formula 2 above is about 0.4.

The main and curing agent compositions were prepared in the same manner as in Example 1 using the filler component, except that the filler component in an amount such that about 88.7 parts by weight of the filler component was present in 100 parts by weight of the resin composition in which the main and curing agent compositions were mixed, was divided into two equal weights and blended into each of the main and curing agent compositions.

Comparative Example 3

As the filler component, a mixture of a first alumina filler having an average particle diameter of about 40 μm, a second alumina filler having an average particle diameter of about m and a third alumina filler having an average particle diameter of about 2 μm, wherein the weight ratio (first alumina filler: second alumina filler: third alumina filler) between the fillers was about 3:1:1, was used.

The value of General Formula 1 above for the filler component is about 3, and the value of General Formula 2 above is about 1.

The main and curing agent compositions were prepared in the same manner as in Example 1 using the filler component, except that the filler component in an amount such that about 86.7 parts by weight of the filler component was present in 100 parts by weight of the resin composition in which the main and curing agent compositions were mixed, was divided into two equal weights and blended into each of the main and curing agent compositions.

Comparative Example 4

As the filler component, a mixture of a first alumina filler having an average particle diameter of about 40 μm, a second alumina filler having an average particle diameter of about m and a third alumina filler having an average particle diameter of about 2 μm, wherein the weight ratio (first alumina filler: second alumina filler: third alumina filler) between the fillers was about 13:10:10, was used.

The value of General Formula 1 above for the filler component is about 1.3, and the value of General Formula 2 above is about 1.

The main and curing agent compositions were prepared in the same manner as in Example 1 using the filler component, except that the filler component in an amount such that about 86.7 parts by weight of the filler component was present in 100 parts by weight of the resin composition in which the main and curing agent compositions were mixed, was divided into two equal weights and blended into each of the main and curing agent compositions.

Comparative Example 5

As the filler component, a mixture of a first alumina filler having an average particle diameter of about 70 μm and a third alumina filler having an average particle diameter of about 2 μm, wherein the weight ratio (first alumina filler: third alumina filler) between the fillers was about 7:3, was used.

The main and curing agent compositions were prepared in the same manner as in Example 1 using the filler component, except that the filler component in an amount such that about 87.6 parts by weight of the filler component was present in 100 parts by weight of the resin composition in which the main and curing agent compositions were mixed, was divided into two equal weights and blended into each of the main and curing agent compositions.

Physical properties measured for the resin compositions were summarized and described in Table 1 below.

TABLE 1

| | | Average particle diameter (μm) | | | | | Thermal conductivity (W/mK) | Load value (kgf) | Solid matter hardness (gf) | |
|---|---|---|---|---|---|---|---|---|---|---|
| | | First filler | Second filler | Third filler | $W_A/W_B$ | $W_B/W_C$ | | | Main agent | Curing agent |
| Example | 1 | 70 | 20 | 2 | 3 | 1 | 3.1 | about 25 | 50 | 43 |
| | 2 | 70 | 20 | 2 | 2 | 1.5 | 3.0 | about 22 | 50 | 50 |
| | 3 | 70 | 20 | 2 | 5 | 0.5 | 3.0 | about 25 | 65 | 70 |
| | 4 | 65 | 20 | 2 | 3 | 1 | 3.2 | about 25 | 50 | 50 |
| | 5 | 120 | 20 | 2 | 3 | 1 | 3.2 | about 25 | 40 | 40 |
| Comparative Example | 1 | 70 | 20 | 2 | 1.3 | 1 | 3.0 | about 25 | 47 | 139 |
| | 2 | 70 | 20 | 2 | 3 | 0.4 | 3.0 | about 30 | 300 | 400 |
| | 3 | 40 | 20 | 2 | 3 | 1 | 3.0 | about 30 | 250 | 300 |
| | 4 | 40 | 20 | 2 | 1.3 | 1 | 3.1 | about 30 | 323 | 458 |
| | 5 | 70 | — | 2 | — | — | 3.1 | about 50 | 50 | 43 |

$W_A$: weight ratio (weight %) of the first filler in the component (based on 100 weight % of the total of the first to third fillers)
$W_B$: weight ratio (weight %) of the second filler in the filler component (based on 100 weight % of the total of the first to third fillers)
$W_C$: weight ratio (weight %) of the third filler in the filler component (based on 100 weight % of the total of the first to third fillers)

From Table 1, it could be seen that the resin compositions of Examples 1 to 5 comprising the filler component satisfying all the average particle diameters of the fillers and General Formulas 1 and 2 exhibited the high thermal conductivity and low load value, and the hardness of solid matters generated in the main and curing agent compositions was also maintained at a low level. On the other hand, in the case of Comparative Example 1, which did not satisfy the condition of General Formula 1, the hardness of the solid content in the curing agent was high, whereby it was confirmed that it could overload the equipment in the injection process.

In Comparative Example 2, which did not satisfy the condition of General Formula 2, the high thermal conductivity was ensured, but the load value was large, and the hardness of the main and curing agent compositions was also high.

In Comparative Example 3, which did not satisfy the particle diameter condition of the filler component, Comparative Example 4, which did not satisfy the particle diameter condition and the condition of General Formula 1, and Comparative Example 5, which included only two fillers as the fillers, the thermal conductivity was secured to some extent, but the load value and/or the hardness of the solid content showed poor results.

The invention claimed is:

1. A resin composition, comprising:
a resin component; and
a filler component,
wherein the filler component comprises a first filler having an average particle diameter in a range of 60 μm to 200 μm, a second filler having an average particle diameter in a range of 10 μm to 30 μm, and a third filler having an average particle diameter of 5 μm or less,
wherein the filler component comprises a spherical filler and a non-spherical filler, and the spherical filler is included in an amount of 30 to 95 weight % based on a total weight amount of the filler component, and the non-spherical filler is included in the third filler,
wherein the filler component comprises an α-phase filler, and the α-phase filler is included in an amount of 90 weight % or less based on the total weight amount of the filler component,
wherein the resin composition has a thermal conductivity of 3.0 W/mK or more after being cured, and
wherein the following general formulas 1 and 2 are satisfied:

$$2 \leq W_A/W_B \leq 5 \quad \text{[General Formula 1]}$$

$$0.5 \leq W_B/W_C \leq 3 \quad \text{[General Formula 2]}$$

wherein, $W_A$ is a weight ratio of the first filler in the filler component, $W_B$ is a weight ratio of the second filler in the filler component, and $W_C$ is a weight ratio of the third filler in the filler component.

2. The resin composition according to claim 1, wherein the resin composition has a load value of greater than 10 kgf and less than 30 kgf.

3. The resin composition according to claim 1, wherein the filler component is included in an amount of 91 weight % or less based on a total weight amount of the resin composition.

4. The resin composition according to claim 1, wherein the filler component comprises fumed silica, clay, calcium carbonate, aluminum oxide, aluminum nitride, boron nitride, silicon nitride, silicon carbide, beryllium oxide, zinc oxide, aluminum hydroxide, boehmite, magnesium oxide, magnesium hydroxide or a carbon filler.

5. The resin composition according to claim 1, wherein the first filler is included in an amount of 50 to 80 weight % based on the total weight amount of the filler component.

6. The resin composition according to claim 1, wherein the spherical filler is included in an amount of 30 to 85 weight % based on the total weight amount of the filler component-.

7. The resin composition according to claim 1, wherein the α-phase filler is included in an amount of 85 weight % or less based on the total weight amount of the filler component.

8. The resin composition according to claim 1, wherein the resin component comprises a main resin or a curing agent.

9. The resin composition according to claim 8, wherein the main resin is a polyol resin, and the curing agent is an isocyanate.

10. The resin composition according to claim 9, wherein polyol of the polyol resin is an ester polyol.

11. The resin composition according to claim 9, wherein polyol of the polyol resin is an amorphous ester polyol, or an ester polyol having a melting point of less than 15° C.

12. The resin composition according to claim 9, wherein the isocyanate is a non-aromatic polyisocyanate.

13. A battery module, comprising:
- a module case having a top plate, a bottom plate and sidewalls, and having an internal space formed by the top plate, the bottom plate and the sidewalls;
- a plurality of battery cells existing in the internal space of the module case; and
- a resin layer formed by curing the resin composition according to claim 1 and in contact with at least one of the plurality of battery cells or the bottom plate or the sidewalls.

14. A battery pack comprising two or more battery modules of claim 13 that are electrically connected to each other.

15. An automobile comprising the battery module of claim 13.

16. An automobile comprising the battery pack of claim 14.

* * * * *